(12) United States Patent
Stevenson

(10) Patent No.: US 7,617,798 B2
(45) Date of Patent: Nov. 17, 2009

(54) ANIMAL BEDDING ADDITIVE AND ANIMAL BEDDING CONTAINING THE SAME

(75) Inventor: Randal D. Stevenson, Cottage Grove, WI (US)

(73) Assignee: Technologies Holdings Corp., Houston, TX (US)

( * ) Notice: Subject to any disclaimer, the term of this patent is extended or adjusted under 35 U.S.C. 154(b) by 267 days.

(21) Appl. No.: 11/553,517

(22) Filed: Oct. 27, 2006

(65) Prior Publication Data

US 2008/0098958 A1 May 1, 2008

(51) Int. Cl.
*A01K 1/015* (2006.01)

(52) U.S. Cl. .................. 119/526; 119/28.5; 424/405; 424/76.8

(58) Field of Classification Search ......... 119/171–173, 119/28.5, 526
See application file for complete search history.

(56) References Cited

U.S. PATENT DOCUMENTS

| | | | |
|---|---|---|---|
| 3,793,213 A * | 2/1974 | Taber et al. ................. 510/387 |
| 4,641,605 A | 2/1987 | Gordon | |
| 5,005,520 A | 4/1991 | Michael | |
| 5,176,879 A | 1/1993 | White et al. | |
| 5,329,880 A | 7/1994 | Pattengill et al. | |
| 5,458,906 A * | 10/1995 | Liang ........................ 427/2.31 |
| 5,542,374 A | 8/1996 | Palmer, Jr. | |
| 6,196,156 B1 * | 3/2001 | Denesuk et al. ............ 119/28.5 |
| 6,468,518 B2 | 10/2002 | Lind et al. | |
| 6,726,936 B1 * | 4/2004 | Asano et al. ................. 424/618 |
| 2003/0041808 A1* | 3/2003 | Wulforst et al. ............ 119/28.5 |
| 2003/0172457 A1* | 9/2003 | Pilling et al. .................... 5/484 |
| 2004/0127463 A1* | 7/2004 | Trinh et al. .................... 514/58 |
| 2007/0107662 A1* | 5/2007 | Queen et al. ............... 119/28.5 |

* cited by examiner

*Primary Examiner*—Michael R Mansen
*Assistant Examiner*—Valentina Xavier
(74) *Attorney, Agent, or Firm*—Andrus, Sceales, Starke & Sawall, LLP

(57) ABSTRACT

An animal bedding mixture is disclosed herein. The animal bedding mixture includes a bedding material and a bedding material additive. Bedding material is preferably straw, sawdust, sand or recycled manure solids. The bedding material additive is preferably 60-99% by weight absorbent clay powder, 0.1 to 35% by weight chlorite salt, and 0.01-35% by weight sodium bisulfate or sodium percarbonate. The bedding material additive of the present disclosure is inert when dry and neither germicidal or acidic. However, when the additive is exposed to moisture, such as animal urine, the sodium bisulfate will acidify the liquid, causing the formation of hypochlorous acid and chlorine dioxide. Hypochlorous acid and chlorine dioxide are very powerful, broad spectrum germicides that have proven efficacy against *E. coli, Staphylococcus aureus*, and other micro-organisms commonly found in animal bedding.

21 Claims, No Drawings

ANIMAL BEDDING ADDITIVE AND ANIMAL BEDDING CONTAINING THE SAME

BACKGROUND AND SUMMARY OF THE DISCLOSURE

This application relates to bedding for animals, and particularly bedding for livestock such as cattle and horses.

Throughout Agrarian times, farmers have recognized the importance of shelter and bedding in the comfort and well-being of livestock. Livestock that are well-kept and content generally produce more food and have a greater longevity as work animals. Providing comfort to these animals during rest and sleep is essential for keeping the animals content and productive. Thus, farmers have used bedding materials such as straw, sawdust, sand and even recycled manure solids for their livestock. Thus, bedding generally provides cushion, support and warmth essential to comforting the animals.

However, the use of such bedding has a serious drawback in that such materials have a tendency to retain the animals' excreted waste products. The need to groom the bedding and sometimes completely replace the bedding every few days for hygienic reasons constitutes a high cost and labor and replacement materials for a farmer.

Accordingly, there is the need and the animal husbandry field for an animal bedding additive that when added to bedding materials such as straw, sawdust, sand or recycled manure solids is inert, but when contacted by moisture, e.g. urine, produces germicidal agents effective to counteract many micro-organisms commonly found in animal bedding, such as *E. coli, Staphylococcus aureus*, and others. Thus, the animal bedding, when combined with the bedding material additive disclosed herein remains hygienic for a longer period of time reducing labor costs and replacement material costs for a farmer.

The present disclosure contemplates animal bedding having a bedding material and a bedding material additive. The bedding material is preferably straw, sawdust, sand or recycled manure solids, but may be any type of bedding material known in the art of animal husbandry. The bedding material additive preferably includes 60-99% by weight absorbent clay or powder, 0.1 to 35% by weight chlorite salt, and 0.1 to 35% by weight sodium bisulfate or sodium percarbonate. The chlorite salt may be sodium chlorite, magnesium chlorite, potassium chlorite or calcium chlorite. Preferably, sodium chlorite is used. The bedding material additive may also include 0.01 to 5% by weight of a surfactant. This surfactant is preferably sodium dodecylsulfate, dodecyl ammonium sulfate, sodium cholate, sodium deoxycholate, N-lauroylsarcosine sodium salt, lauryldimethylamine-oxide, cetyltrimethylammoniumbromide, dodecyl benzene sulfonic acid, ethoxylated alkyl phenol, or bis(2-ethylhexyl)sulfosuccinate sodium salt. Most preferably, the surfactant is dodecyl benzene sulfonic acid. Additionally, the bedding additive may further include 0.01 to 5% by weight urea. If it is so desired, the bedding material additive may also include a dye in an amount effective to achieve coloration of the additive. If it is so desired, the bedding material additive may also include a perfume or other material to emit and diffuse a fragrant odor in an amount effective to achieve a desirable odor for the additive. The bedding material additive may be provided in either powdered or a granule form.

When the bedding material additive is dry, it is inert and neither germicidal nor acidic. However, when the bedding material additive is exposed to moisture, e.g. urine or rain, either the sodium bisulfate will acidify the solution, creating an acidic environment, or the sodium percarbonate will release oxygen into the solution, creating an oxidative environment. The acid or oxidant will instigate the formation of hypochlorous acid and chlorine dioxide from the chlorite salt. The acidification of the sodium bisulfate also is effective to reduce ammonia and cause a reduction in odor. Hypochlorus acid and chlorine dioxide are powerful, broad spectrum germicides that have proven efficacy against *E. coli, Staphylococcus aureus*, and other micro organisms commonly found in animal bedding.

DETAILED DESCRIPTION

The animal bedding of the present disclosure includes a combination of bedding material and a bedding material additive. The bedding material is preferably straw, sawdust, sand or recycled manure solids, but may be any type of bedding material that is commonly used within the field of animal husbandry. The bedding material additive is preferably combined with the bedding material from either a powdered or granular form.

The bedding material additive includes 60-99% by weight absorbent clay or power, 0.1 to 35% by weight chlorite salt, and 0.1 to 35% by weight sodium bisulfate or sodium percarbonate. Preferably, the additive comprises 98.5% absorbent clay or powder, 0.5% sodium chlorite, and 1% sodium bisulfate or sodium percarbonate. The bedding material additive may also include 0.01% to 5% of a surfactant, 0.01 to 5% by weight urea and 0.001 to 0.1% dye.

The chlorite salt to be used is preferably sodium chlorite, dry (80%) (CAS#15630-89-4). However, magnesium chlorite, potassium chlorite and calcium chlorite may also be used as the chlorite salt of the bedding material additive. Preferably, the sodium bisulfate used is technical grade sodium bisulfate, anhydrous globular (CAS#7681-38-1). The preferred sodium percarbonate constituency is technical grade sodium percarbonate (CAS#15630-89-4).

As aforementioned, the bedding material additive is mixed with a bedding material such as straw, sawdust, sand, or recycled manure solids and used as bedding for animals, preferably livestock such as cows or horses. The primary benefit of using the chlorite salt and sodium bisulfate or sodium percarbonate mixture as an additive is that it is inert, stable and non-acidic in a dry environment for an extended period of time, but when it interacts with moisture, chlorine dioxide and hypochlorous acid is formed creating a potent, broad spectrum germicide. Specifically, when the additive is exposed to moisture, such as urine from an animal, the sodium bisulfate or sodium percarbonate will acidify or oxidize in the presence of moisture create an acid or oxidant. When that acid or oxidant interacts with the chlorite salt, hypochlorous acid and chlorine dioxide are formed changing the inert dry mixture into a powerful germicidal agent. Moreover, the acidification of the moisture operates to reduce ammonia causing a reduction in odor. Hypochlorous acid and chlorine dioxide are very powerful, broad spectrum germicides that have proven efficiency against *E. coli, Staphylococcus aureus*, and other micro-organisms commonly found in animal bedding.

In a preferred embodiment, where the chlorite salt is sodium chlorite and sodium bisulfate is used in the additive, sodium bisulfate first interacts with water to form an acid according to the following reaction:

$$NaHSO_4 + H_2O \rightarrow Na^+ + H_3O^+ + SO_4^{2-}$$

The acid then interacts with sodium chlorite to form the germicides chloride dioxide and hypochlorous acid according to the following reactions:

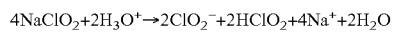

Quickly, an equilibrium is achieved between the hypochlorous acid and the chlorine dioxide according to the following equation:

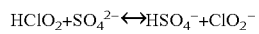

Accordingly, broad spectrum germicides are generated from an animal bedding additive that, while inert when dry, quickly forms germicides unexposed to moisture. The relevant reactions noted above also apply to other chlorite salts, such as magnesium chlorite, potassium chlorite and calcium chlorite, and those ordinary skilled in the art will understand that the relevant reactions vary accordingly to the salt used.

The absorbent clay or powder used in the bedding material additive present disclosure is preferably absorbent clay or powder available from Alphatech (Croissant, France). As aforementioned, the bedding material additive may also include 0.01-5% by weight of a surfactant. The surfactant is preferably sodium dodecylsufate, sodium ammonium sulfate, sodium cholate, sodium deoxycholate, dodecyl benzene sulfonic acid, ethoxylated alkyl phenol, N-lauroylsarcosine sodium salt, lauryldimethylamine-oxide, cetyltrimethylammoniumbromide, and bis(2-ethylhexyl)-sulfosuccinate sodium salt. Dodecyl benzene sulfonic acid, ethoxylated alkyl phenol are the preferred surfactants used in this mixture, and may be used together in an amount totaling 0.01-5% by weight. Both are readily available from a variety of manufacturers. Dodecyl benzene sulfonic acid is available for purchase as Bio-Soft S-120 from Stepan (Northfield, Ill., U.S.A.). A preferred type of ethoxylated alkyl phenol is available as Surfonic N-95 from Huntsman (Salt Lake City, Utah, U.S.A.). However, as recognized by one of ordinary skill in the art, any other efficacious surfactant may be used as a substitute for the surfactants listed above. The surfactant helps to trap and wash away microorganisms affected by the broad-based spectrum germicidal agents, and also aids in cleaning animal bedding areas when the bedding of the present application is removed. As aforementioned, the animal bedding additive may also include 0.01 to 5% by weight urea for stabilizing the chlorine dioxide generated by the wetting of this invention. Urea is commonly available and can be purchased from various vendors or manufacturers such as SunOlin Chemical Co. (North Claymont, Del.). The additive may also include dye in an amount effective to achieve coloration of the additive. Generally, the amount of dye to be used in the range of 0.001 to 0.1% by weight of the mixture.

Those skilled in the art will recognize, or be able to ascertain using no more than routine experimentation, many equivalents to the specific embodiment to the invention described herein. Such equivalents are intended to be encompassed by the following claims particularly point and distinctly claim subject matter regarded as the invention.

What is claimed is:

1. An animal bedding comprising:
   a bedding material and
   a bedding material additive; wherein
   the bedding material additive comprises 60 -99% by weight absorbent clay or powder, 0.1-35% by weight chlorite salt, 0.1 -35% by weight sodium bisulfate or sodium percarbonate and 0.01-5% by weight urea.

2. The animal bedding of claim 1, wherein the chlorite salt is selected from the group consisting of: sodium chlorite, magnesium chlorite, potassium chlorite and calcium chlorite.

3. The animal bedding of claim 1, wherein the bedding material is selected from the group consisting of: straw, sawdust, sand and recycled manure solids.

4. The animal bedding of claim 1, wherein the bedding material additive further includes 0.01 - 5% by weight of a surfactant selected from the group consisting of: sodium dodecylsulfate, dodecyl ammonium sulfate, sodium cholate, sodium deoxycholate, N-lauroylsarcosine sodium salt, lauryldimethylamine-oxide, cetyltrimethylammoniumbromide, dodecyl benzene sulfonic acid, ethoxylated alkyl phenol, and bis(2-ethylhexyl)sulfosuccinate sodium salt.

5. The animal bedding of claim 1, wherein the bedding material additive is provided in a powdered form.

6. The animal bedding of claim 1, wherein the bedding material additive is provided in a granule form.

7. The additive of claim 1, wherein sodium bisulfate or sodium percarbonate constituency acidifies or oxidizes when exposed to moisture in an amount effective to reduce ammonia and cause a reduction in odor.

8. The additive of claim 7, wherein the chlorite salt forms germicidal hypochlorous acid and chlorine dioxide when exposed to moisture in the presence of sodium bisulfate or sodium percarbonate.

9. An additive to animal bedding, the additive comprises: 60 -99% by weight absorbent clay or powder, 0.1 -35% by weight chlorite salt, 0.1 -35% by weight sodium bisulfate or sodium percarbonate, and 0.01-5% by weight urea.

10. The additive of claim 9, wherein the chlorite salt is selected from the group consisting of: sodium chlorite, magnesium chlorite, potassium chlorite and calcium chlorite.

11. The additive of claim 9, wherein the additive further comprises 0.01 -5% by weight of a surfactant selected from the group consisting of: sodium dodecylsulfate, dodecyl ammonium sulfate, sodium cholate, sodium deoxycholate, N-lauroylsarcosine sodium salt, lauryldimethylamine-oxide, cetyltrimethylammonium-bromide, dodecyl benzene sulfonic acid, ethoxylated alkyl phenol, and bis(2-ethylhexyl)sulfosuccinate sodium salt.

12. The additive of claim 9, wherein the additive further comprises a dye in an amount effective to achieve coloration of the additive.

13. The additive of claim 9, wherein the additive is provided in a granule form.

14. The additive of claim 9, wherein the additive is provided in a powdered form.

15. The additive of claim 9, wherein sodium bisulfate or sodium percarbonate constituency acidifies or oxidizes when exposed to moisture in an amount effective to reduce ammonia and cause a reduction in odor.

16. The additive of claim 15, wherein the chlorite salt forms germicidal hypochlorous acid and chlorine dioxide when exposed to moisture in the presence of sodium bisulfate or sodium percarbonate.

17. An additive to animal bedding, the additive providing a germicidal effect when exposed to moisture, but that is inert when dry, the additive consisting essentially of: 60 -99% by weight absorbent clay or powder, 0.1 -35% by weight sodium chlorite, 0.1 -35% by weight sodium bisulfate or sodium percarbonate, 0.01 -5% by weight urea and a surfactant selected from the group consisting of: sodium dodecylsulfate, dodecyl ammonium sulfate, sodium cholate, sodium deoxycholate, N-lauroylsarcosine sodium salt, lauryldimethylamine-oxide, cetyltrimethylammoniumbromide, dodecyl benzene sulfonic acid, ethoxylated alkyl phenol, and bis(2-ethylhexyl)sulfosuccinate sodium salt; wherein the additive generates hypochlorous acid and chlorine dioxide when exposed to moisture to provide the germicidal effect.

18. The additive of claim 17, wherein the additive further comprises a dye in an amount effective to achieve coloration of the additive.

19. The additive of claim 17, wherein the additive is provided in a granule form.

20. The additive of claim 17, wherein sodium bisulfate or sodium percarbonate constituency acidifies or oxidizes when exposed to moisture in an amount effective to reduce ammonia and cause a reduction in odor.

21. The additive of claim 20, wherein the chlorite salt forms germicidal hypochlorous acid and chlorine dioxide when exposed to moisture in the presence of sodium bisulfate or sodium percarbonate.

* * * * *

UNITED STATES PATENT AND TRADEMARK OFFICE
CERTIFICATE OF CORRECTION

PATENT NO. : 7,617,798 B2  Page 1 of 1
APPLICATION NO. : 11/553517
DATED : November 17, 2009
INVENTOR(S) : Randal D. Stevenson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 288 days.

Signed and Sealed this

Nineteenth Day of October, 2010

David J. Kappos
*Director of the United States Patent and Trademark Office*